Figure 1:
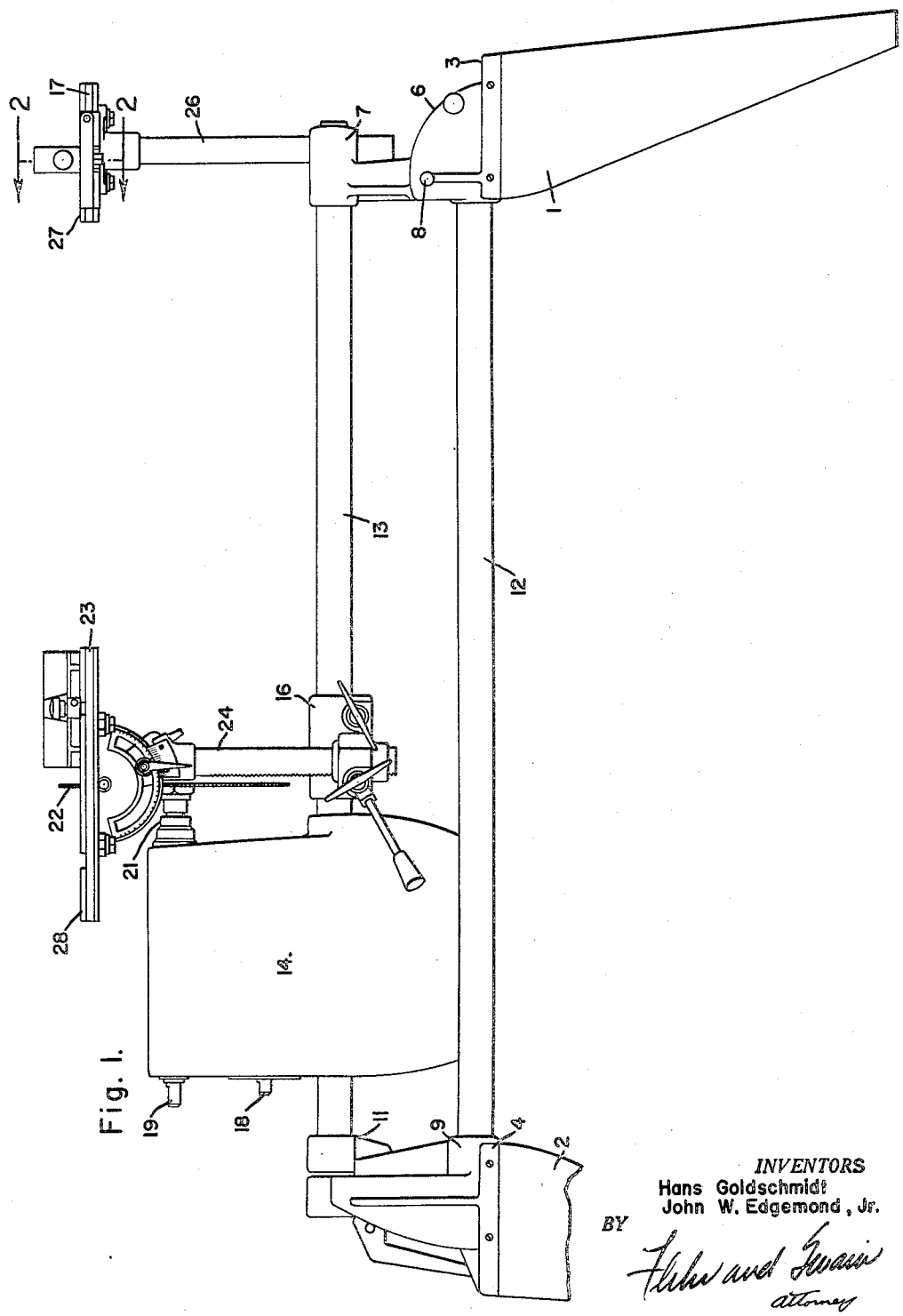

Jan. 5, 1960 J. W. EDGEMOND, JR., ET AL 2,919,729
RIP FENCE FOR SAW TABLE
Original Filed March 15, 1955 2 Sheets-Sheet 2

INVENTOR.
Hans Goldschmidt
John W. Edgemond, Jr.
BY
Attorney

United States Patent Office 2,919,729
Patented Jan. 5, 1960

2,919,729
RIP FENCE FOR SAW TABLE

John W. Edgemond, Jr., Los Altos, and Hans Goldschmidt, Atherton, Calif., assignors, by mesne assignments, to Yuba Consolidated Industries, Inc., San Francisco, Calif., a corporation of Delaware Original application March 15, 1955, Serial No. 494,468. Divided and this application August 30, 1957, Serial No. 681,413

2 Claims. (Cl. 143—174)

This invention relates to and in general has for its object the provision of a rip fence for saw tables or for table extensions and this application is a division of our copending application Serial Number 494,468, filed March 15, 1955, for a "Combination Power Tool."

The objects of our above-identified invention are fully set forth therein and this divisional application relates to the saw fence disclosed as being useful in conjunction with the combination power tool which we describe therein.

In that application our rip fence is disclosed in combination with our combination power tool but, as is readily apparent from an analysis of the above-identified copending application, our rip fence may be used in connection with any saw table or saw table extension.

It is a particular object of this invention to provide, in combination with a work supporting table, a fence associated therewith having a novel lock operable entirely from the front end of the table to first square and seat the fence with and to the front edge of the table and then positively to lock the fence first to the front end of the table and then to the rear end thereof.

It is another object of this invention to provide in combination with a work supporting table, a fence provided in its head with a set screw arranged to seat on the front end of the table and to enable the fence to be aligned with respect to the table.

It is a further object of this invention to provide a fence which may be mounted upon a saw table or upon an extension or auxiliary table.

This invention possesses other advantageous features, some of which, together with the foregoing will be set forth at length in the following description with that form of the invention which has been selected for illustration in the drawings accompanying and forming a part of the present specification. It is to be understood that this invention is not limited to the specific forms shown in the drawing since the invention as set forth in the claims may be embodied in other forms.

Figure 2:
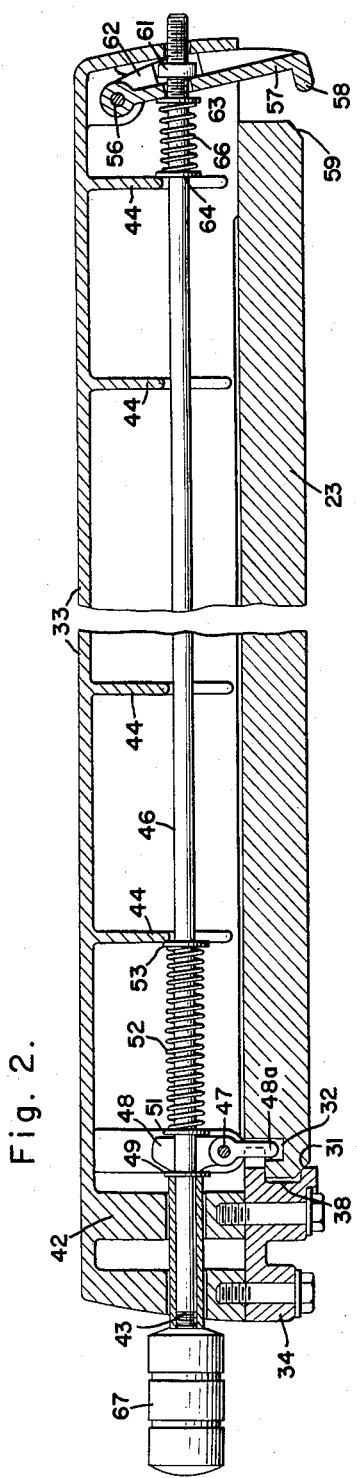
Figure 3:
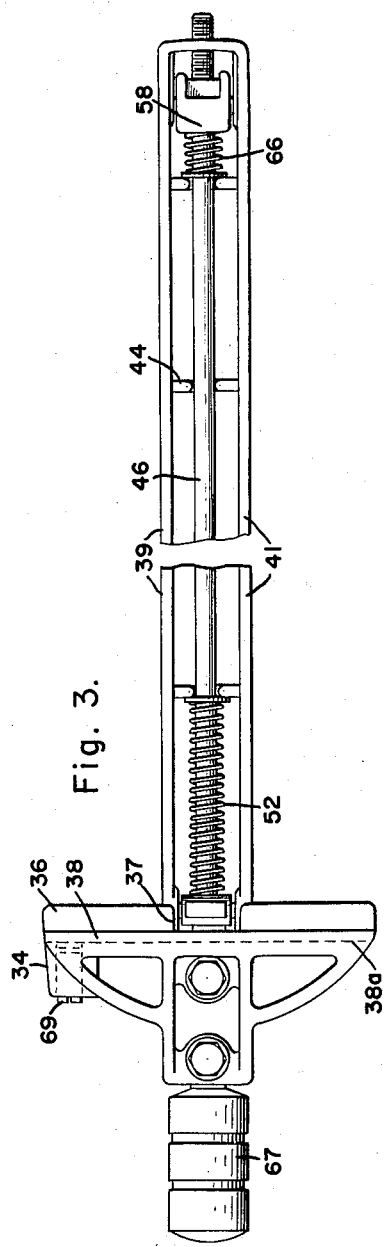

Referring to the drawings:

Figure 1 is a front side elevation view of a combination power tool showing our rip fence mounted upon an extension or auxiliary table, Figure 2 is a vertical mid-section taken through the work supporting table and its associated fence on the section line 2—2 of Figure 1, and Figure 3 is a bottom plan view of the fence shown in Figure 2.

As is generally shown in Figure 1, our rip fence has been shown mounted on a combination tool of the type disclosed in copending application Serial No. 494,468, filed March 15, 1955, for a "Combination Power Tool" of which application, the instant application is a division. The combination power tool disclosed therein includes a pair of opposed identical steel bench ends 1 and 2 which support a pair of bench base assemblies 3 and 4. The assemblies 3 and 4 differ in their construction; the bench base 3 consisting of portions 6 and 7 which are hingedly connected so that portion 7 may pivot about the point 8 and the bench base end 4 consisting of a pair of portions 9 and 11 which may be disconnected so that the portion 11 may be swung upwardly about point 8 and away from portion 9. The assemblies 3 and 4 accommodate two pairs of parallel transversally spaced longitudinally extending tubular ways 12 and 13. The pair of ways 13 accommodate a headstock assembly 14 and a table and tool rest carriage or mount 16. The portion 7 of the bench base assembly 3 supports an auxiliary table assembly 17 which may be raised and lowered with respect thereto.

The headstock 14 is adapted to be moved longitudinally along the ways 13 and generally comprises a suitable casting which supports an electric motor, not illustrated, which drives a plurality of driven shafts 18, 19 and 21 which are designed to accommodate a plurality of tools in the manner described in the aforementioned copending application.

As illustrated in Figure 1, a circular saw 22 is mounted on the shaft 21 and is adapted to be rotated thereby.

The table and tool rest carriage and mount illustrated generally at 16 is of rectangular form and is adapted to be slidably mounted upon the ways 13. The carriage supports a table 23 which is mounted upon a pair of posts 24. The table 23 is conventional in shape and is provided with an elongated slot through which the blade 22 passes. The table assembly 17 is supported by a pair of tubular members 26 and is movable vertically so that its upper surface 27 may be made coplanar with the upper surface 28 of the table 23.

Preferably the lower edge of the front of the table extension or auxiliary table 17 is beveled. The main work supporting table 23 is similarly constructed; that is, its front edge is likewise beveled and made absolutely perpendicular to the sides of the main work supporting table. Preferably the beveled edge of the table extension or auxiliary table 17 should be colinear with the beveled edge of the main table 23 when the two tables are coplanar and the two tables should be of the same length in order that they can accommodate a rip fence of the same length.

Provided in the front edge of each of the tables 23 and 17 in parallel therewith is a channel 32. Mounted on either of these tables is a transversely extending fence 33 of inverted channel shape and bolted to the underside thereof at its front end is a crosshead 34. Extending inwardly from the crosshead and overhanging the channel 32 is a flange or ledge 36 provided with a central notch 37. Provided on the lower inner side of the crosshead is a straight gauging edge 38 perpendicular to the parallel faces 39 and 41 of the fence 33. Slidably mounted in the front end of the fence and through a web 42 formed therein is a sleeve 43, and extending through said sleeve and completely through the fence and through its notched stiffening webs 44 is a rod 46. Pivoted on a pin 47 mounted in the front notched stiffening web 44 is a lever 48 of the first class. The upper end of this lever operates between a washer 49 abutting the rear end of the sleeve 43 and a washer 51 biased by a coil spring 52 surrounding the rod 46. Seated against the opposite end of the spring 52 is a washer 53 backed by one of the notched webs 44. The lower end 48a of the lever 48 extends through the notch 37 and is loosely accommodated in the channel 32. Pivoted to a pin 56 fixed to the rear of the fence is a depending clamp 57 formed with an inwardly extending rounded rib or flange 58 in horizontal alignment with the beveled edge 59 of the table 23 or 17. Threaded to the rear end of the rod 46 is a square nut 61 keyed against rotation within a pair of parallel webs 62 on clamp 57. Mounted on the rod 46 are washers 63 and 64, the washer 63 being backed by the clamp 57 and the washer 64 being backed by adjacent web 44. Disposed between the washers 63 and 64 and surrounding the rod 46 at this point is a coil spring 66. It should be particularly noted here that the spring 66 is substantially stiffer than the spring 52 for the operation of this device depends largely upon this difference. Threaded and fixed to the front end of the rod 46 is a cylindrical operating hand hold 67 for rotating the rod 46.

In Figure 2 the fence is shown in open unclamped position. To lock it to the table, the hand hold 67 is rotated clockwise and since the rear spring 66 is stiffer than the front spring 52, the rod 46 moves to the right; the lower end 48a of the lever 48 moves to the left as viewed in Figure 2 and upon engaging the left hand wall of the channel 32 serves to draw the whole fence assembly to the right until the adjacent gauging edges are in line contact with each other. Since at this point the rod 46 cannot move further to the right, the continued clockwise rotation of the rod will cause the clamp 57 to move to the left until its lip is firmly clamped against the beveled edge 59 of the table. In unlocking the fence, the reverse sequence of action takes place, the clamp 57 is first disengaged and then the lower end 48a moves out of engagement with the table. Here then there has been provided spring biased tandem clamps operated by a single rod entirely from the front end of the table and in a sequence wherein the fence crosshead is first clamped to the gauging edge of the table before the rear clamp locks the entire device.

Under normal operations it will be assumed that the straight gauging edge 38 is perpendicular to the parallel faces 39 and 41 of the fence 33 and that it may be urged into engagement with the front end of either one of the tables with the result that the parallel faces 39 and 41 are parallel to the plane of the saw blade 22. However any one of a number of factors, as for example, misalignment of the saw blade or of the front of the table, may render it necessary to realign the parallel faces 39 or 41 with respect to the table in order to cause the same to be parallel with the plane of the saw blade 22. As illustrated in Figure 3 the crosshead 38 is threaded to accommodate a set screw 69 which may be advanced or retracted. When the set screw 69 is retracted the face 38 will engage the front end of the table throughout its entire length. However when the member 69 is advanced beyond the plane of the gauging edge 38, it, together with the remote end 38a of the gauging face 38 will define a new plane which will engage the front end of the table. Thus it will be seen by operating the member 69 the plane of the straight gauging edge 38 may be varied whereby the vertical parallel faces 39 and 41 may be realigned and brought parallel to the plane of the saw blade 22.

From the foregoing it is apparent that we have provided a novel lock for a rip fence which is operable entirely from the front end of the table to force, square and seat the fence with and to the front edge of the table and then positively lock the fence first to the front end of the table and then to the rear end thereof. It is also apparent that we have provided a fence which is provided in its head with a set screw arranged to seat on the front end of the table and to enable the fence to be angled with respect to the table and brought into a parallel relationship with the plane of the saw.

We claim:

1. A table having a front gauging edge and provided on its upper face with a channel adjacent and parallel to said gauging edge; a hollow fence arm seated on said table and provided at its front end with a crosshead arranged to engage said front gauging edge; a first clamping finger pivoted to said arm with its lower end receivable in said channel; a second clamping finger pivoted to said arm with its lower end adjacent to the rear end of said table and arranged to be brought into clamping engagement therewith; a first means for biasing said first clamping finger against counter-clockwise rotation; a second means for biasing said second clamping finger against clockwise rotation, the biasing action of said second means being greater than the biasing action of said first means; a rod extending through said arm; a nut threaded to the rear end of said rod, said nut being disposed immediately behind said second clamping finger and keyed against rotation; means for causing said first clamping finger to rotate clockwise in response to any rearward travel of said rod; and means provided on the front end of said rod and external to said arm for rotating said rod.

2. A table having a front gauging edge and provided on its upper face with an adjacent, parallel channel; a hollow fence arm seated on said table and provided at its front end with a crosshead arranged to engage said front gauging edge; a first clamping finger pivoted intermediate its ends to and within said arm on an axis transverse thereto, the lower end of said finger being receivable in said channel; a second clamping finger pivoted at its upper end to and within the rear end of said arm on an axis transverse thereto, the lower end of said second clamping finger being arranged upon the clockwise rotation thereof to engage the rear end of said table; an operating rod extending longitudinally through said arm and threaded at its rear end to a nut disposed immediately to the rear of said second clamping finger, said nut being keyed against rotation but free to travel on said rod; a first coil spring surrounding said rod immediately rearward of the upper end of said first clamping finger; spring stop means on said arm for engaging the rear end of said spring; a second coil spring surrounding said rod immediately forward and intermediate the ends of said second clamping finger; spring stop means on said arm immediately forward of said second coil spring, said second coil spring being substantially stiffer than said first coil spring; means on said rod immediately forward of the upper end of said first finger for rotating said first clamping finger clockwise against the biasing action of said first spring and in response to any rearward travel of said rod; and means provided on the front end of said rod and external to said arm for rotating said rod, the rotation of said rod in a clockwise direction causing said rod first to advance into said nut while said nut and second clamping finger are held against forward movement until said first clamping finger firmly engages the front end of said table and wherein the further clockwise rotation of said rod causes said nut and said second clamping finger to travel forwardly until said second clamping finger is in firm engagement with the rear end of said table.

References Cited in the file of this patent

UNITED STATES PATENTS

| 2,140,323 | Lonskey | Dec. 13, 1938 |
| 2,166,703 | Boice | July 18, 1939 |
| 2,521,302 | Musselman | Sept. 5, 1950 |
| 2,556,548 | Madderman | June 12, 1951 |
| 2,562,246 | Van Dam et al. | July 31, 1951 |
| 2,630,845 | Eschenberg | Mar. 10, 1953 |
| 2,677,400 | Gaskell | May 4, 1954 |
| 2,806,493 | Gaskell | Sept. 17, 1957 |